United States Patent Office 2,851,485
Patented Sept. 9, 1958

2,851,485

7-ALKANOYL DERIVATIVES OF PODOCARPIC ACID

Roy H. Bible, Jr., Morton Grove, Ill., assignor to G. D. Searle & Co., Chicago, Ill., a corporation of Illinois No Drawing. Application September 2, 1955
Serial No. 532,363

4 Claims. (Cl. 260—514.5)

The present invention relates to polyhydrophenanthrene compounds and is specifically concerned with 7-alkanoyl derivatives of podocarpic acid having the structural formula

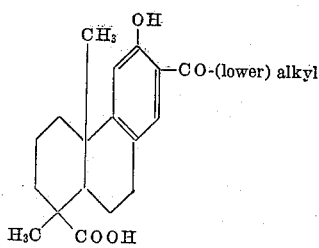

In this srtuctural formula the lower alkyl radical can represent such groups as methyl, ethyl, and straight- and branched-chain propyl, butyl, amyl, hexyl, heptyl, and octyl.

In a suitable method for the manufacture of the compounds of this invention, podocarpic acid is first converted to methyl O-methylpodocarpate by reaction with an excess of dimethyl sulfate, and then to a methyl O-methyl-7-alkanoylpodocarpate by the aluminum chloride-catalyzed reaction of methyl O-methylpodocarpate with an alkanoyl halide such as acetyl chloride, acetyl bromide, propionyl chloride, propionyl bromide or a higher homolog. The conversion of a methyl O-methyl-7-alkanoylpodocarpate to a 7-alkanoylpodocarpic acid can be achieved in either a single step or a multiple step operation. For example, heating methyl O-methyl-7-acetylpodocarpate (J. Am. Chem. Soc., 62, 1292 (1940)) with pyridine hydrochloride causes cleavage of both the methyl ester and the methyl ether, with the formation of 7-acetylpodocarpic acid.

As an example of an alternate method for the manufacture of the compounds of this invention, methyl O-methyl-7-acetylpodocarpate is heated with a mixture such as aluminum chloride in chlorobenzene or hydrobromic acid in acetic acid, whereby there occurs principally cleavage of the phenolic ether with the formation of methyl 7-acetylpodocarpate. Hydrolysis of the carboxylic acid ester is then achieved by dissolving this compound in sulfuric acid and pouring the solution into an excess of water, causing the formation of a precipitate of 7-acetylpodocarpic acid. Equally satisfactory results are obtained by the cleavage of other alkyl esters and other alkyl ethers of 7-alkanoylpodocarpic acids.

The discovery that many carboxylic acid esters in the podocarpic acid series can be conveniently hydrolyzed by dissolving the esters in concentrated sulfuric acid and then diluting the sulfuric acid solutions with water is a significant advancement of the art. The esters in this series of compounds are extremely sterically hindered and the severe conditions which have been employed in the past lead to much destruction of other parts of the molecule before the desired hydrolysis is accomplished. The concentrated sulfuric acid method is especially favored over basic reagents for the hydrolysis of esters such as methyl 7-acetylpodocarpate which are relatively unstable to basic reaction conditions.

The compounds of this invention are useful for their physiological activities. They have valuable pharmacological properties which are not exhibited by structurally related compounds known to the prior art. The compounds of this invention are hypotensive agents. In addition, they have selective anti-cortisone activities, and, administered with cortisone, they inhibit the ability of cortisone to produce such undesired side effects as decreasing the lymph node weight and causing a spread of bacterial infection.

These examples are set forth by way of illustration only and it will be understood that the invention is not to be construed as limited in spirit or in scope by the details contained therein. Many modifications in materials and methods will be apparent from this disclosure to those skilled in the art. In these examples temperatures are given in degrees centigrade (°C.) and quantities of materials in parts by weight.

*Example 1*

Pyridine hydrochloride (250 parts) is placed in a round-bottomed flask and a distillation is carried out until the vapor temperature reaches about 215° C. The forerun which is collected in this manner is discarded, and 20 parts of methyl O-methyl-7-acetylpodocarpate is added to the pyridine hydrochloride remaining in the distillation flask. This mixture is heated under partial reflux for 1 hour in such a manner that excess pyridine is allowed to escape from the reaction vessel. The mixture is then cooled and diluted to several times its volume with water. The precipitated product is collected on a filter and washed with a small quantity of dilute hydrochloric acid and then with copious amounts of water. When this reddish-brown solid is purified by sublimation followed by recrystallization from aqueous methanol, there are obtained well-formed crystals of 7-acetylpodocarpic acid melting at 213.5–216° C. This compound has the structural formula

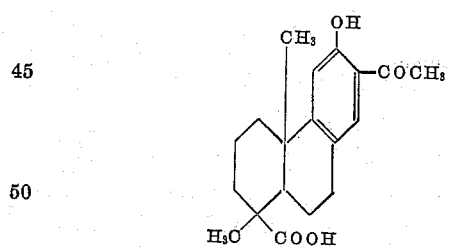

*Example 2*

To a stirred mixture of 200 parts of aluminum chloride and 440 parts of chlorobenzene is added a solution of 172.2 parts of methyl O-methyl-7-acetylpodocarpate in 330 parts of chlorobenzene over a period of 15 minutes. The reaction proceeds exothermally and external cooling is supplied, if necessary, to keep the reaction temperature at about 65° C. or lower during the period of addition. When the addition is complete, the stirred mixture is maintained at about 80° C. for an additional hour, after which it is cooled and treated by the gradual addition of water and dilute hydrochloric acid. The mixture is then subjected to distillation under reduced pressure until almost all of the chlorobenzene is removed, after which the residual aqueous suspension is chilled and filtered. The crude crystalline product is purified by recrystallization from a mixture of chloroform and methanol to yield methyl 7-acetylpodocarpate melting at about 153–157° C. This compound has the structural formula

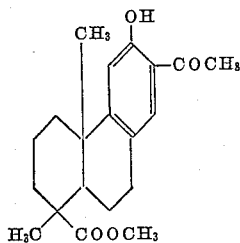

Example 3

To 50 parts of methyl 7-acetylpodocarpate there is added 920 parts of concentrated sulfuric acid, and the mixture is stirred until dissolution is complete. About 10 minutes is required for this operation. The solution is then cautiously poured, with efficient stirring, into 2000 parts of cold water. After the mixture is chilled, the solid product is collected on a filter and washed with water. This crude product is dissolved in sodium hydroxide solution, and the solution is filtered from a small amount of insoluble residue. The filtrate is acidified with dilute hydrochloric acid, and the precipitated product is collected on a filter and washed with water. Purification by recrystallization from aqueous methanol affords 7-acetylpodocarpic acid, identical with the product of Example 1.

Example 4

A stirred mixture of 302.4 parts of methyl O-methylpodocarpate and 1100 parts of chlorobenzene is maintained at about 10° C. and treated by the gradual addition of 273 parts of aluminum chloride. The mixture is stirred for 10 minutes after the addition of the aluminum chloride has been completed, and then there is gradually added a solution of 185 parts of propionyl chloride in 155 parts of chlorobenzene. The stirred reaction mixture is maintained at about 10–15° C. during this period of addition and for 3 hours thereafter, after which the reaction mixture is allowed to stand at room temperature for 16 hours. It is then poured into 1500 parts of ice water containing 210 parts of concentrated hydrochloric acid. The chlorobenzene is removed by distillation with steam, and the residual aqueous suspension is chilled until crystallization is complete. The solid product is collected and purified by repeated recrystallization from methanol to yield methyl O-methyl-7-propionylpodocarpate melting at 96–98° C.

Example 5

To a stirred mixture of 8 parts of aluminum chloride in 110 parts of chlorobenzene there is added a solution of 10 parts of methyl O-methyl-7-propionylpodocarpate in 55 parts of chlorobenzene. Stirring is continued and the mixture is maintained at about 80° C. for an additional hour, after which it is cooled and poured into ice-water. Dilute hydrochloric acid and benzene washings of the reaction vessel are added, and the organic solvents are removed by distillation under reduced pressure. The product remaining is then separated and washed by decantation with several portions of water. Purification by recrystallization from aqueous methanol then affords methyl 7-propionylpodocarpate melting at 98–99.5° C.

Example 6

Methyl 7-propionylpodocarpate (3 parts) is dissolved by stirring it with 28 parts of concentrated sulfuric acid for about 10 minutes. The solution is then cautiously poured into 75 parts of water, and the resulting suspension is chilled and filtered. The solid product is washed with water and then recrystallized from aqueous methanol to yield 7-propionlypodocarpic acid melting at 145–147° C. This compound has the structural formula

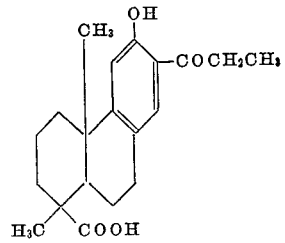

Example 7

By the procedure of Example 4, with the substitution of 213 parts of butyryl chloride for the propionyl chloride, there is obtained methyl O-methyl-7-butyrylpodocarpate. Substitution of 10 parts of this compound for the methyl O-methyl-7-propionylpodocarpate in Example 5 yields methyl 7-butyrylpodocarpate. Treatment of 3 parts of methyl 7-butyrylpodocarpate with concentrated sulfuric acid according to the procedure of Example 6 affords 7-butyrylpodocarpic acid having the structural formula

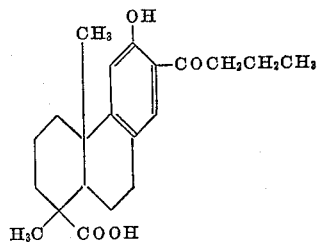

What is claimed is:
1. A compound of the structural formula

$$\text{(structure with CH}_3\text{, OH, CO-(lower) alkyl, H}_3\text{C, COOH)}$$

2. 7-acetylpodocarpic acid.
3. 7-propionylpodocarpic acid.
4. 7-butyrylpodocarpic acid.

References Cited in the file of this patent

UNITED STATES PATENTS 2,767,162   Picha _____ Oct. 16, 1956

OTHER REFERENCES

JACS, vol. 62, May 1940, pages 1287–1292.